(12) United States Patent
Phipps et al.

(10) Patent No.: US 10,944,326 B2
(45) Date of Patent: Mar. 9, 2021

(54) POWER SUPPLY DELAY TO PREVENT OSCILLATIONS FOR AUTONOMOUS SYSTEMS

(71) Applicant: The United States of America as represented by the Secretary of the Navy, San Diego, CA (US)

(72) Inventors: Alex G. Phipps, San Diego, CA (US); Everly Yeo, San Diego, CA (US); Victor Saucedo, San Diego, CA (US); Frank Alonge, San Diego, CA (US); Rennie Andrews, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 442 days.

(21) Appl. No.: 16/058,276

(22) Filed: Aug. 8, 2018

(65) Prior Publication Data
US 2020/0052599 A1 Feb. 13, 2020

(51) Int. Cl.
*H02M 3/335* (2006.01)
*B64C 39/02* (2006.01)
*H02J 9/06* (2006.01)
*H02M 1/00* (2006.01)

(52) U.S. Cl.
CPC ....... *H02M 3/33523* (2013.01); *B64C 39/024* (2013.01); *H02J 9/066* (2013.01); *B64C 2201/108* (2013.01); *H02J 9/068* (2020.01); *H02M 2001/0096* (2013.01)

(58) Field of Classification Search
CPC ............. H02M 3/335; H02M 3/33507; H02M 3/33523; H02M 3/33569; H02M 3/0083; H02M 2001/0096; B64C 39/022; B64C 39/024; H02J 9/04; H02J 9/06; H02J 9/061; H02J 9/066; H02J 9/068
See application file for complete search history.

(56) References Cited

U.S. PATENT DOCUMENTS

| | | | | | |
|---|---|---|---|---|---|
| 3,886,431 | A | * | 5/1975 | Meier | H02M 1/081 363/41 |
| 9,450,453 | B2 | * | 9/2016 | Yeh | H02J 7/02 |
| 2016/0233719 | A1 | * | 8/2016 | Guckin | H02J 7/0068 |
| 2018/0013319 | A1 | * | 1/2018 | Kanarellis | H02J 9/00 |
| 2019/0280346 | A1 | * | 9/2019 | Liao | H01M 10/44 |

* cited by examiner

*Primary Examiner* — Matthew V Nguyen
(74) *Attorney, Agent, or Firm* — Naval Information Warfare Center, Pacific; Kyle Eppele; Susanna J. Torke

(57) ABSTRACT

A method for autonomous systems comprising the steps of using a feedback circuit to provide power to an autonomous system, wherein the feedback circuit is configured to alternate between a first and second sources of power depending on availability of power; creating a delay in the circuit by electrically coupling the circuit to a comparator, a one-shot signal, and a low pass filter, wherein the delay is configured to last for a specified amount of time, and wherein the delay will prevent the power from uncontrolled back and forth oscillation between the first and second power sources.

13 Claims, 2 Drawing Sheets

POWER SUPPLY DELAY TO PREVENT OSCILLATIONS FOR AUTONOMOUS SYSTEMS

FEDERALLY-SPONSORED RESEARCH AND DEVELOPMENT

Power Supply Delay to Prevent Oscillations for Autonomous Systems is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email ssc_pac_T2@navy.mil. Reference Navy Case Number 105502.

BACKGROUND

Unmanned aerial vehicles (UAVs) are attractive platforms for a wide variety of DoD applications. Commercially available systems minimize cost and development time but typically have mission lifetimes on the order of 30-60 minutes since they are battery operated. Tethered UAVs dramatically increase mission duration because constant power can be delivered to the system. Most tethered UAVs have a primary power supply, which provides consistent power to the motors for an extended period of time. In situations where the primary supply fails or disconnects, a secondary power supply—usually in the form of a rechargeable battery—is often mounted on the UAV and used as a back-up source of power with enough capacity to ground the UAV safely.

Certain flight scenarios such as a sharp turn or a takeoff during high wind conditions can cause the motors of the UAV to require high amounts of power. The power required under these conditions can exceed the amount of power available from the primary supply. When this occurs, the primary supply shuts off and the secondary supply powers the UAV. The primary source no longer has a load since the secondary source is supplying all the power to the UAV. Under this condition, the primary source tries to momentarily provide as much power as it can to the UAV but since the required load is higher than its limit, the secondary source takes over. This pattern causes oscillations between the primary and secondary sources. Oscillations result in an increase in switching cycles between sources. Constant switching can cause the temperature of electronics to rise very rapidly and potentially damage the electronics. If mechanical switches are used, an increase in switching cycles can shorten the lifespan of the switch.

Most systems address this issue by using primary power supplies that can meet or exceed the maximum power required by the UAV. Commercially available power supplies vary greatly in cost, size, voltage/current limitation and availability. Any combination in restrictions can result in the selection of a primary power supply that does not meet the system's maximum requirements.

DETAILED DESCRIPTION OF SOME EMBODIMENTS

Reference in the specification to "one embodiment" or to "an embodiment" means that a particular element, feature, structure, or characteristic described in connection with the embodiments is included in at least one embodiment. The appearances of the phrases "in one embodiment", "in some embodiments", and "in other embodiments" in various places in the specification are not necessarily all referring to the same embodiment or the same set of embodiments.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

Figure 1:
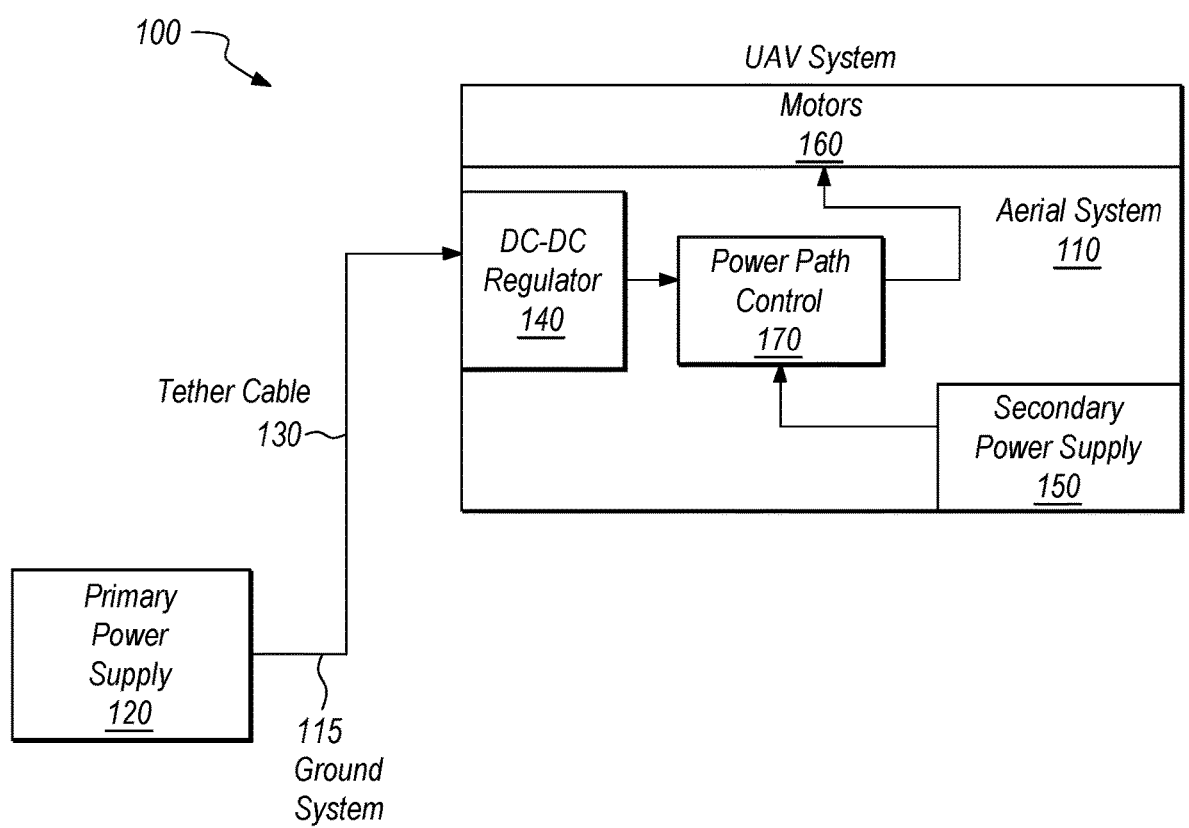
FIG. 1 shows a system diagram of the UAV tethered system in accordance with Power Supply Delay to Prevent Oscillations for Autonomous Systems.

FIG. 1 shows an autonomous system 100 having an aerial system 110 and a ground system 115. Aerial system 110 is powered by a primary power supply 120 located on ground system 115. One embodiment of aerial system 110 is an unmanned aerial vehicle (UAV). Primary power supply 120 is connected to a tether cable 130, which delivers a high voltage low current DC signal to aerial system 110. The high-voltage signal is needed to get power up tether cable 130, but once the power has reached aerial system 110, the high voltage signal is then down-regulated to a lower voltage using a DC-DC regulator 140. A secondary power supply 150, such as a rechargeable battery, can be mounted onto aerial system 110 to provide a secondary source of power to UAV motors 160 in case primary power supply 120 fails or tether cable 130 disconnects. A power path controller 170 determines and prioritizes which source powers UAV motors 160 on aerial system 110. If tether power is available, aerial system 110 will be powered from primary power supply 120. Otherwise, secondary power supply 150 will be used. Autonomous system 100 described herein uses a 384-volt primary power supply to generate 1600 watts of power required by the UAV, but other system values could also be used.

Sharp maneuvers during high wind conditions can cause the motors on a UAV to require more power than is actually available from primary power supply 110. In this event, primary power supply 110 will shut down to prevent potential damage. With no power available from primary power supply 110, power path controller 170 will switch to secondary power supply 150 since rechargeable batteries can typically provide high amounts of current at the tradeoff of reduced capacity. As primary power supply 110 recovers from its fault state, no load is present since UAV motors 160 are solely powered by secondary power supply 150. As a result, primary power supply 110 tries to bear the load of UAV motors 160 but the power required is still too high and it enters a fault state again. This oscillation causes power path controller 170 to constantly switch between primary power supply 110 and secondary power supply 150.

Switching can cause the temperature of electronics to rise quickly and lead to damage. If mechanical switches are used, increased switching cycles degrades the components' lifespan.

To reduce oscillations, UAV system 100 detects when primary power supply 110 enters a shutdown state due to over powering. In this event, a delay (not shown in FIG. 1) is added so primary power supply 110 will remain in an off state for a pre-selected amount of time. While primary power supply 110 is off, UAV system 100 will be solely powered from secondary power supply 150. Switching cycles in power path controller 170 are reduced because the UAV no longer oscillates between power sources 110 and 150. Instead, the delay allows UAV system 100 to perform its high-powered maneuver under secondary power supply 150 before returning to an operating state where the primary power supply 110 can sufficiently power UAV system 100.

Figure 2:
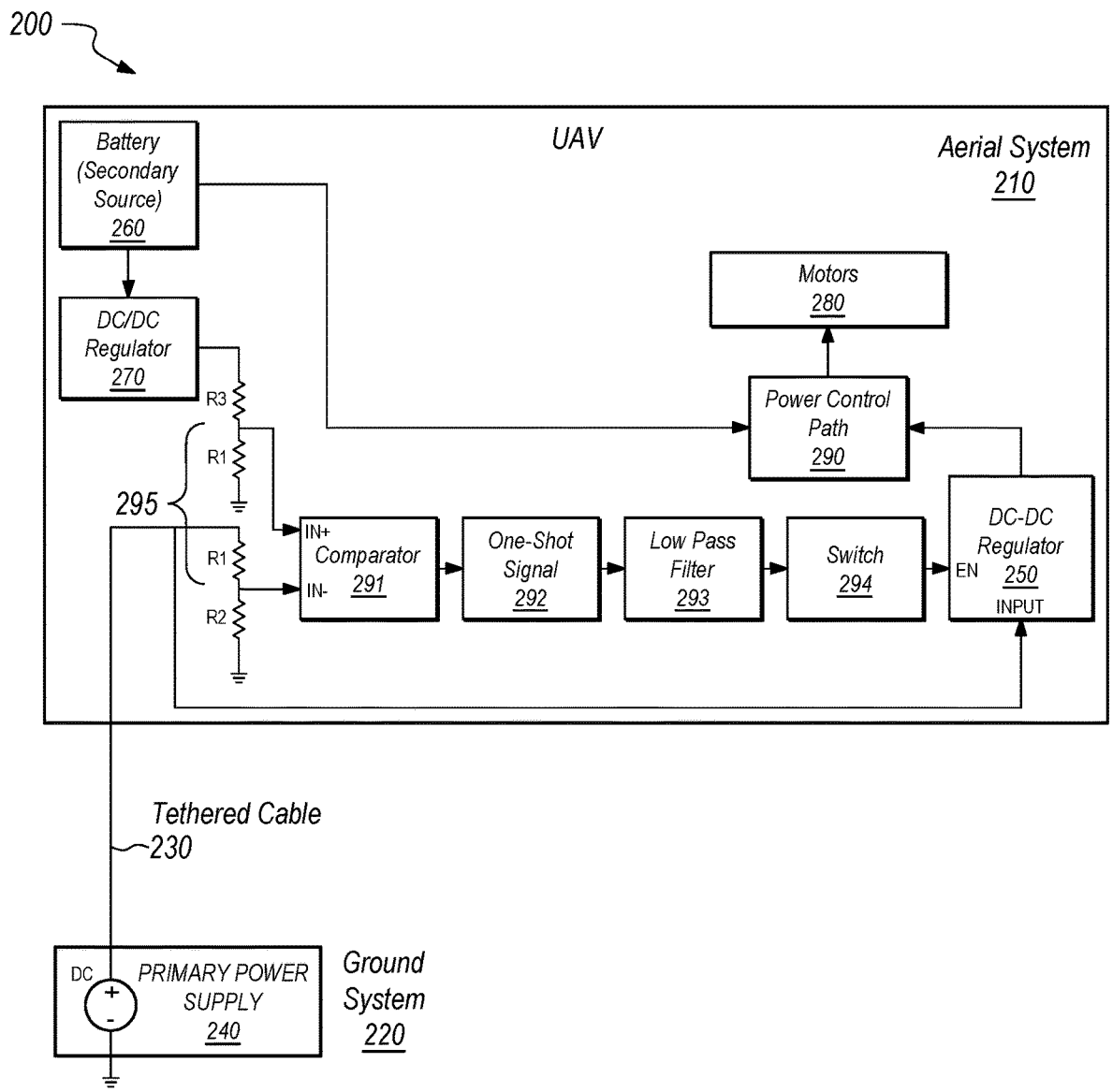
FIG. 2 shows a block diagram of the oscillation detection and the delay to the primary source in accordance with Power Supply Delay to Prevent Oscillations for Autonomous Systems.

FIG. 2 shows a block diagram of a UAV 200 having an aerial system 210. Aerial system 210 is electrically coupled to a ground system 220 via a tether cable 230. Tether cable 230 connects UAV 200 to a primary power supply 240. Primary power supply 240 is typically realized with a high voltage to minimize loss along tether cable 230, and is reduced to a voltage level that can be utilized by the platform using DC-DC regulator 250. A secondary power supply 260 is located within aerial system 210, and is typically implemented with a battery. Because a battery's voltage can fluxuate, a second DC/DC regulator 270 generates a threshold voltage to keep secondary power supply 260 at a set charge. In the event it is needed, secondary power supply 260 can supply power directly to the motors 280 located within aerial system 210 without the need for a voltage conversion.

In the embodiment described herein, a feedback loop/circuit is created in aerial system 210 between primary power supply 240 and secondary power supply 260 to prevent oscillation when power from primary power supply 240 has been severed. A power path controller 290 provides aerial system 210 with power from primary power supply 220, via the DC/DC regulator 250 by default. Power path controller 290 detects if power from primary power supply 240 has been interrupted due to tether 230 breaking or a ground system 220 failure. If power has been interrupted, power path controller 290 switches to secondary power supply 260. In previous embodiments, this would result in a constant oscillation between primary power supply 240 and secondary power supply 260. To prevent power path controller 290 from oscillating between the primary 240 and secondary 260 power sources, a delay is added to the aerial system 210 to ensure that any fault in primary power supply 240 will cause it to remain off for a pre-determined amount of time, allowing for proper re-charging and/or fixing of primary power supply 240.

Comparator 291 initiates the delay when the voltage from primary power supply 240 falls below a set threshold. Comparator 291 compares the output voltage on primary power supply 240 to a set reference generated by secondary power supply 260. The reference signal is generated off secondary power supply 260 because primary power supply 240 is in shutdown. The output of comparator 291 will generate a high signal only when primary power supply 240 is in shutdown. A delay is made possible using comparator 291, a one-shot signal 292 (also known as a mono-stable multivibrator), a low-pass filter 293, and a switch 294. A plurality of resistors 295 are used to control flow of power depending on which power source is being used. One-shot signal 292 and low pass filter 293 keep the output of comparator 291 high for a finite amount of time which can be changed depending on the needs of aerial system 210. One-shot signal 292 is used to drive the enable port of DC/DC regulator 270. One-shot signal 292 and low pass filter 293 implement a delay that disables DC/DC regulator 250 for a period of time in hopes that the high stress UAV maneuver will end before primary power supply 240 is used to power aerial system 210 under normal flight conditions.

In addition to UAVs, the embodiment described herein can be used for surface and underwater vehicles. This system can also be used where load requirements exceed the available power from its source.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A method to prevent power oscillations for autonomous systems comprising:
   using a primary power supply on a ground surface to power an autonomous system, wherein the primary power supply is electrically connected to the autonomous system using a tether cable, and wherein the tether cable is configured to deliver a high voltage and low current DC signal to the autonomous system;
   mounting a secondary power supply on the autonomous system, wherein the secondary power supply is configured to provide a secondary source of power to the autonomous system if the primary power supply fails or the tether cable disconnects;
   using a first DC-DC regulator to lower the voltage delivered to the autonomous system via the primary power supply;
   using a power path controller electrically coupled to the first DC-DC regulator and a second DC-DC regulator to switch from the primary power supply to the secondary power supply when the primary power supply is cut off, wherein the second DC-DC regulator is configured to generate a threshold voltage from the secondary power supply;

using a comparator electrically connected to the second DC-DC regulator to initiate a delay when the voltage from the primary power supply falls below the threshold voltage;

implementing the delay using a one-shot signal, a low-pass filter, and a switch electrically coupled to the first and second DC-DC regulators, wherein the first DC/DC regulator is disabled for a set period of time, the delay causing the autonomous system to be powered solely from the secondary power supply;

returning to an operating state where the primary power supply can sufficiently power the autonomous system.

2. The method of claim 1, wherein a rechargeable battery provides power for the secondary power supply.

3. The method of claim 2, wherein the delay prevents the autonomous system from oscillating between power sources.

4. The method of claim 3, further comprising the step of using the comparator to compare an output voltage on the primary power supply to a set reference generated from the secondary power supply, and wherein the output voltage generates a high signal when the primary power supply is in shutdown, and wherein the one-shot signal and the low pass filter keep the output voltage of the comparator high until the primary power supply can power the autonomous system.

5. The method of claim 4, wherein the first DC-DC regulator lowers the voltage from 400 v to 26 v.

6. The method of claim 5, wherein the autonomous system is an unmanned aerial vehicle.

7. A system comprising:

a primary power supply on a ground surface, wherein the primary power supply is electrically connected to an autonomous system using a tether cable, and wherein the tether cable is configured to deliver a high voltage and low current DC signal to the autonomous system;

a secondary power supply, wherein the secondary power supply is mounted on the autonomous system, and where the secondary power supply is configured to provide a secondary source of power to the autonomous system if the primary power supply fails or the tether cable disconnects;

a first DC-DC regulator configured to lower the voltage delivered to the autonomous system via the primary power supply;

a power path controller electrically coupled to the first DC-DC regulator and a second DC-DC regulator, wherein the power path controller is configured to switch from using the primary power supply to using the secondary power supply when the primary power supply is cut off, and wherein the second DC-DC regulator is configured to generate a threshold voltage from the secondary power supply;

a comparator electrically connected to the second DC-DC regulator, wherein the comparator is configured to initiate a delay when the voltage from the primary power supply falls below the threshold voltage;

a circuit comprising a one-shot signal, a low-pass filter, and a switch electrically, wherein the circuit is electrically coupled to the first and second DC-DC regulators, and wherein the first DC/DC regulator is disabled for a set period of time, the delay causing the autonomous system to be powered solely from the secondary power supply until the primary power supply can sufficiently power the autonomous system.

8. The system of claim 7, wherein the secondary power supply is a rechargeable battery.

9. The system of claim 8, wherein the high voltage is 400 volts and the lowered voltage is 26 volts.

10. The system of claim 9, wherein the autonomous system is an unmanned aerial vehicle.

11. A method for autonomous systems comprising the steps of:

using a feedback circuit to provide power to an autonomous system, wherein the feedback circuit is configured to alternate between a first and second sources of power depending on availability of power;

creating a delay in the circuit by electrically coupling the circuit to a comparator, a one-shot signal, and a low pass filter, wherein the delay is configured to last for a specified amount of time, and wherein the delay will prevent the power from uncontrolled back and forth oscillation between the first and second power source.

12. The method of claim 11, wherein the first power source provides power from the ground and the second power source provides power from the air.

13. The method of claim 12, further comprising the step of using a power path controller to alternate between using the first and second sources of power.

* * * * *